United States Patent
Ishihara et al.

[11] Patent Number: 6,101,066
[45] Date of Patent: Aug. 8, 2000

[54] MAGNETIC HEAD, MAGNETIC RECORDING/REPRODUCING APPARATUS

[75] Inventors: Hirohisa Ishihara; Isao Nakabayashi, both of Niigata-ken, Japan

[73] Assignee: Alps Electric Co., Ltd., Japan

[21] Appl. No.: 08/987,339

[22] Filed: Dec. 9, 1997

[30] Foreign Application Priority Data

Dec. 9, 1996 [JP] Japan ................................. 8-328574

[51] Int. Cl.[7] ...................................................... G11B 5/60
[52] U.S. Cl. ............................................................ 360/103
[58] Field of Search ................................... 360/103, 122

[56] References Cited

U.S. PATENT DOCUMENTS

| | | | |
|---|---|---|---|
| 4,251,841 | 2/1981 | Jacobs | 360/122 |
| 5,010,429 | 4/1991 | Taguchi et al. | 360/103 |
| 5,052,099 | 10/1991 | Taguchi et al. | 29/603 |
| 5,079,657 | 1/1992 | Aronoff et al. | 360/103 |
| 5,083,365 | 1/1992 | Matsumoto | 29/603 |
| 5,162,073 | 11/1992 | Aronoff et al. | 156/625 |
| 5,323,282 | 6/1994 | Kanai et al. | 360/103 |
| 5,327,310 | 7/1994 | Bischoff et al. | 360/103 |
| 5,347,412 | 9/1994 | Nitta et al. | 360/103 |
| 5,413,850 | 5/1995 | Nehring | 360/122 |
| 5,748,408 | 5/1998 | Barrois et al. | 360/103 |
| 5,841,608 | 11/1998 | Kasamatsu et al. | 360/103 |

*Primary Examiner*—George J. Letscher
*Attorney, Agent, or Firm*—Brinks Hofer Gilson & Lione

[57] ABSTRACT

The present invention provides a magnetic head including a slider 1 and a thin-film element 3, a magnetic recording/reproducing apparatus including the same, and a method for manufacturing the same. According to the present invention, since a resist layer is formed on the thin-film element 3 prior to a milling process, the thin-film element can be protected from the influence of the milling process, and generation of an element recess can be inhibited. Further, since the slider 1 is preferably formed of a ceramic composition including $Al_2O_3$ and TiC, the roughness can be readily adjusted by the milling process. Moreover, when the center line mean roughness of each opposing surface 5 of the slider, said surface opposing the recording medium, is represented by $R_{ah1}$ and that of the disk serving as the recording medium is represented by $R_{ad}$, the relationship, 6 nm $\leq R_{ah1} + R_{ad} \leq$ 19 nm is preferably satisfied. Due to this, adsorption between the opposing surface and the surface of the disk can be prevented, and the torque for starting the disk can be lowered.

5 Claims, 5 Drawing Sheets

MAGNETIC HEAD, MAGNETIC RECORDING/REPRODUCING APPARATUS

BACKGROUND OF THE INVENTION

1. Field of the Invention

The present invention relates to a magnetic head including a slider and installed in a hard disk drive, a magnetic recording/reproducing apparatus equipped with the magnetic head, and a method of manufacturing the same. More specifically, in the magnetic head, the torque required for starting a recording medium is reduced, and a magnetic recording/reproducing thin-film element disposed in the end portion on the trailing side of said slider is protected to reduce the size of an element recess.

2. Description of the Related Art

FIG. 8 is a perspective view showing a conventional magnetic head used in a hard disk drive or the like when the head is placed such that the surface opposing the recording medium faces upward, namely, the upper surface of the magnetic head H shown in FIG. 8 faces the recording surface of a hard disk being a magnetic recording medium.

In the magnetic head H, the upstream side (i) relative to the disk-moving direction X is called a leading side while the downstream side (ii) relative to the same is called a trailing side. The magnetic head H includes a slider 1 formed of a ceramic material or the like, and the slider 1 is equipped with a thin-film element 3 on the end surface 2 on the trailing side (ii). The thin-film element 3 has a MR head (reading head) which reads magnetic signals by detecting leakage magnetic fields from a recording medium such as a hard disk while utilizing the magnetoresistance effect, and has an inductive head (recording head) in which a coil and other elements are patterned.

In the slider 1, the portion to oppose the disk includes an air groove 7 and rail portions 4 forming both side walls of the groove, and the top surfaces of the rail portions 4 are opposing surfaces (Air Bearing Surface; ABS) 5. Each of the opposing surfaces 5 has a crown with a predetermined curvature, and a slope 6 in the end portion on the leading side.

The slider 1 of the magnetic head H is supported by a flexure which is fixed to the tip of a load beam, and is urged to the disk by an elastic force of the load beam derived from a plate spring. Such a magnetic head H is used in a hard disk drive of a so-called CSS (Contact Start/Stop) type, and the opposing surfaces 5 of the slider come into contact with the recording surface of the disk by the elastic force when the disk is at a standstill. When the disk is started, an air stream is introduced along the disk-moving direction (X direction) into the space between the slider 1 and the surface of the disk, the opposing surfaces 5 then receive a floating force derived from the air stream, and the slider 1 floats at a height slightly distant from the disk surface.

In the floating situation, the head slants such that the portion on the leading side (i) is situated higher from the disk surface than the portion on the trailing side (ii). In this floating attitude, magnetic signals from the disk are detected by the MR head of the thin-film element 3, or magnetic signals are recorded by the inductive head.

A disk-driving motor installed in a CSS-type hard disk drive requires a starting torque great enough for securely causing the disk and slider to slide. When the starting torque required for starting the disk and slider is greater, the motor used in the hard disk drive must be larger. Accordingly, reduction in size of the equipment will be limited, and the power consumption will be large.

The starting torque required for starting the disk depends on the static frictional force between the opposing surfaces 5 of the slider 1 and the surface of the disk. Accordingly, reducing the starting torque requires reducing the static frictional force.

In hard disks as conventional recording media, the surface is relatively irregular, and in general, the center line mean roughness $R_{ad}$ of the disk plane is approximately 10 nm. Due to this, even if the opposing surfaces 5 of the slider 1 are relatively smooth, the real contact area between the disk surface and the opposing surfaces 5 of the slider 1 can be decreased, and as a result, the static frictional force can be reduced.

In recent hard disks for high recording densities, however, the disk surface have been made increasingly smoother, and the center line mean roughness $R_{ad}$ (according to JIS; Japanese Industrial Standard) of the disk plane has tended to be reduced. When the center line mean roughness $R_{ad}$ of the disk plane is large, protrusions irregularly appear on the disk surface. Accordingly, the slider may contact such protrusions causing damage of the disk surface when the magnetic head takes the floating attitude for magnetic recording/reproducing. In particular, since the hard disk for high-density recording should have more reduced spacing between the thin-film element 3 and the disk plane, generation of such irregular protrusions must be prevented. For the above-described reasons, a high-density recording hard disk is manufactured so that it has a smooth disk surface that is almost the same as a mirror surface.

In a disk drive for a hard disk which has a smoother disk surface and which is capable of coping with high-density recording, therefore, the opposing surfaces 5 of the slider 1 should be made rougher to decrease the real contact area between the disk plane and the opposing surfaces 5.

In such a magnetic head H of the type shown in FIG. 8, however, achieving an appropriate roughness of the opposing surfaces 5 alone is extremely difficult.

For example, an attempt to make the opposing surfaces 5 of the slider 1 rough by dry etching may result in damage to the thin-film element 3 due to the influence of the dry etching. This problem occurs since the thin-film element 3 is generally formed of a material having a relatively high etching rate, such as aluminum oxide or permalloy.

FIG. 9 is a side view showing only the portion on the trailing side (ii) of the magnetic head shown in FIG. 8. When the opposing surfaces 5 are dry-etched, the exposed portion 8 as the upper surface of the thin-film element 3 is also etched so that the level of the upper surface is lowered by a height of h2, and a portion 3' of the thin-film element surrounded by the dotted line is removed. When such an element recess with a height of h2 is generated, the spacing loss between the thin-film element 3 and the disk plane increases, leading to a reduction in signal-recording efficiency and reading sensitivity. In other cases, the thin-film element 3 may be destroyed, and normal reading and recording may become impossible.

Alternatively, a mechanical polishing treatment can be employed to make the opposing surfaces 5 rough. Such a mechanical polishing treatment, however, cannot adjust the center line mean roughness $R_{ah}$ to an appropriate degree, the maximum roughness $R_{max}$ (according to JIS) becomes large, irregular protrusions are generated on the opposing surfaces 5, and the disk surface may thereby readily be damaged. Further, such a mechanical polishing treatment has a further higher possibility of damaging the thin-film element 3.

SUMMARY OF THE INVENTION

The present invention has accomplished to solve the above-described problems of the related art, and an object of the invention is to provide a magnetic head which includes a slider having opposing surfaces exhibiting an appropriate center line mean roughness $R_{ah}$ and which includes a thin-film element free of a recess.

Another object of the present invention is to provide a magnetic head manufacturing method in which the opposing surfaces of the slider can be processed so as to have an appropriate surface roughness, and generation of a recess in the thin-film element can be prevented.

Further, another object of the present invention is to provide a magnetic recording/reproducing apparatus in which the surface roughness of the opposing surfaces of the slider is readily optimized so that the static frictional force between the opposing surfaces and the recording medium is optimized, and the torque required for starting the recording medium is thereby reduced.

According to an aspect of the present invention, there is provided a magnetic head including:

a slider which comes into contact with the surface of the recording medium when the recording medium is at a standstill, and which takes a floating attitude while receiving a floating force from an air stream on the surface of the recording medium according to the movement of the recording medium such that the end portion on the trailing side floats or slides on the recording medium; and an element for magnetic recording and/or reproducing provided in said trailing-side end portion of the slider, wherein:

the slider includes opposing surfaces which oppose the recording medium, and each opposing surface is roughened except for a predetermined area in the end portion on the trailing side.

Further, according to another aspect of the present invention, there is provided a magnetic recording/reproducing apparatus including a recording medium and a magnetic head, wherein the magnetic head includes:

a slider which comes into contact with the surface of the recording medium when the recording medium is at a standstill, and which takes a floating attitude while receiving a floating force from an air stream on the surface of the recording medium according to the movement of the recording medium such that the end portion on the trailing side floats or slides on the recording medium; and an element for magnetic recording and/or reproducing provided in said trailing-side end portion of the slider, and wherein:

the slider includes opposing surfaces which oppose the recording medium, and each opposing surface is roughened except for a predetermined area in the end portion on the trailing side; and when the center line mean roughness of the roughened area on each said opposing surface is represented by $R_{ah1}$ while that of the surface of the recording medium is represented by $R_{ad}$, the relationship, 6 nm $\leq R_{ah1} + R_{ad} \leq$ 19 nm, is satisfied.

Preferably, the slider is formed using a ceramic material which is a mixture of several types of grains having different ion-milling rates.

When the opposing surfaces of the slider formed using such a ceramic material are subjected to an ion-milling process, due to a difference in the ion-milling rate, grains having low ion-milling rates remain on and roughen the opposing surfaces.

Incidentally, the center line mean roughness of the roughened area on each opposing surface of the slider can be adjusted by varying the formulation of the ceramic material for the slider and/or varying the time period of milling. A desired roughness can be readily achieved especially by determining the formulation of the ceramic material.

In the present invention, aluminum oxide-titanium carbide being a mixture of $Al_2O_3$ (aluminum oxide) grains and TiC (titanium carbide) grains can preferably be used.

The ratio of $Al_2O_3$ and TiC should preferably satisfy the relationship, $Al_2O_3$:TiC=50:50 to 95:5 (% by weight)

Further, each opposing surface of the slider, which opposes the recording medium, should preferably have protrusions of TiC grains.

Moreover, the non-roughened area on each opposing surface, which is situated in the end portion on the trailing side, should preferably have a center line mean roughness $R_{ah2}$ of 0.2 to 2 nm.

Moreover, the average height difference h1 at the boundary between the roughened area and the non-roughened area on the trailing side of each opposing surface should preferably be 3 to 50 nm.

Still further, the length T of the non-roughened area on the trailing side of each opposing surface should preferably be 5 to 400 $\mu$m.

According to another aspect of the present invention, there is provided a method for manufacturing a magnetic head, said magnetic head including:

a slider which comprises a material including plural types of grains having different ion-milling rates, includes at least one opposing surface that opposes the recording medium, comes into contact with the surface of a recording medium when said recording medium is at a standstill, and takes a floating attitude while receiving a floating force from an air stream on the surface of said recording medium according to the movement of said recording medium such that an end portion on the trailing side floats or slides on the recording medium; and an element for magnetic recording and/or reproducing provided in said trailing-side end portion of said slider, wherein said method includes the steps of:

polishing each said opposing surface;

forming a resist layer on a predetermined area on each said opposing surface, the area being situated in the trailing-side end portion;

milling each said opposing surface other than said area coated with said resist layer in order to perform surface-roughening based on differences in the milling rates of said grains; and removing each resist layer.

In the present invention, when the opposing surfaces of the slider are subjected to ion milling, a resist film is formed so as to cover the upper surface of the exposed portion of the thin-film element and an area on each opposing surface of the slider, the area having a predetermined length T from the trailing-side end. Accordingly, the thin-film element is not affected by ion milling, and generation of spacing loss due to generation of an element recess can be prevented.

Further, after ion milling, grains having low ion-milling rates remain in the area on each opposing surface, the area not being coated with the resist layer, and the center line mean roughness of each opposing surface is larger. In particular, when the center line mean roughness of each opposing surface is represented by $R_{ah1}$ while that of the recording medium is represented by $R_{ad}$, the sum of $R_{ah1}$ and $R_{ad}$ should preferably fall within the range from 6 nm to 19 nm, namely, satisfy the relationship, 6 nm $\leq R_{ah1}+$ $R_{ad} \leq 19$ nm. When the center line mean roughness of each opposing surface $R_{ah1}$ is appropriately adjusted so as to satisfy the range, the real contact area between the slider and the disk surface can be reduced, and adsorption due to lubricant or water film applied to the disk surface can be prevented. Accordingly, the static frictional force between the disk surface and the opposing surfaces of the slider can be lowered, and the torque for starting the disk can be reduced.

The slider takes a floating attitude, and in this state the trailing-side end portion where the element is installed floats or slides on the recording medium. Here, this sliding movement may be continuous or discontinuous.

DESCRIPTION OF THE PREFERRED EMBODIMENT

Figure 1:
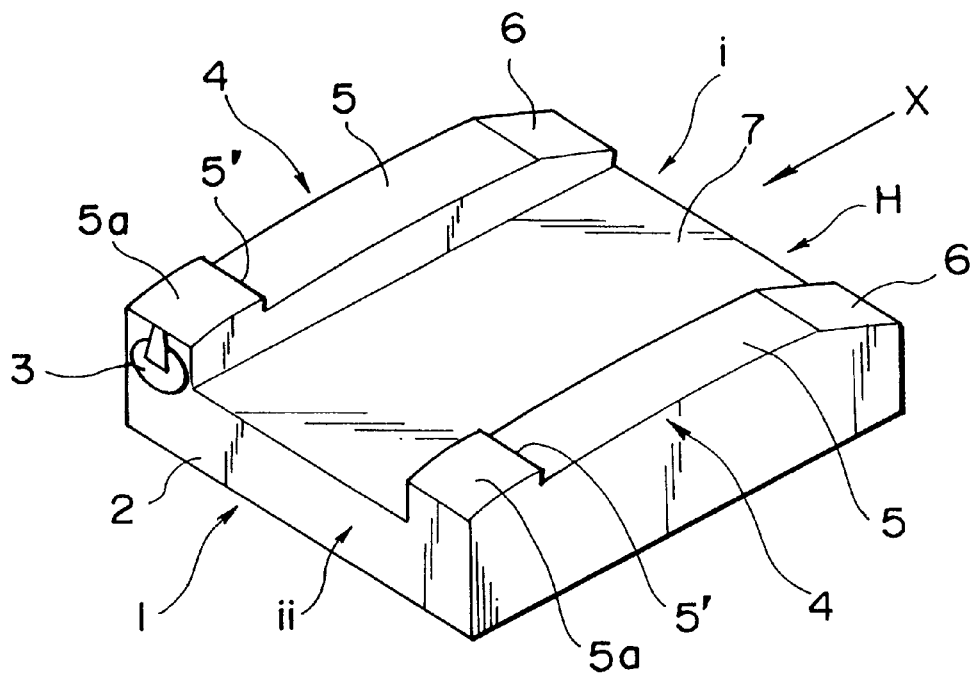
FIG. 1 is a perspective view of the magnetic head according to the present invention when it is placed such that the surface which should oppose the disk faces upward.
Figure 2:
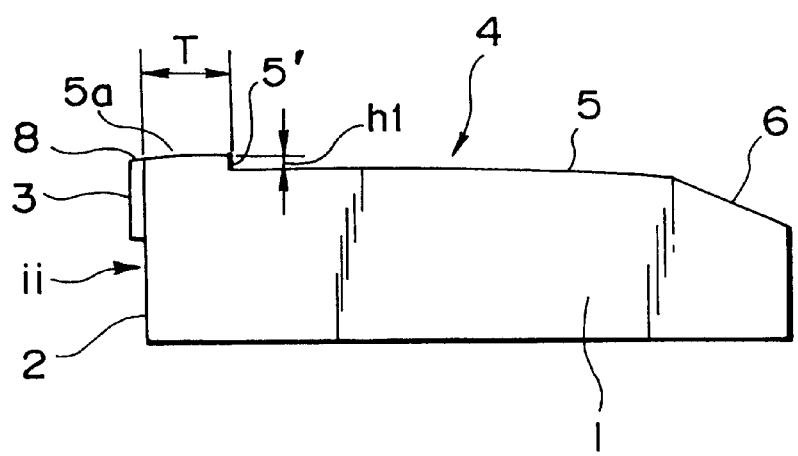
FIG. 2 is a side view of the magnetic head shown in FIG. 1.

FIG. 1 is a perspective view of the magnetic head used in the magnetic recording/reproducing apparatus of the present invention when it is placed such that the surface which should oppose the disk faces upward, and FIG. 2 is a side view of the magnetic head.

The slider 1 of the magnetic head H shown in FIGS. 1 and 2 is formed using a ceramic material which is prepared from a sintered mixture of several types of grains having different ion-milling rates. In the slider 1, the portion to oppose the disk includes an air groove 7 and rail portions 4 forming both side walls of the groove.

The top surface of each rail portion 4 is an opposing surface (Air Bearing Surface; ABS) 5 which has been subjected to a roughening treatment and has a predetermined surface roughness except for a smooth area 5a which has a length T from the end on the trailing side (ii) and is not subjected to the roughening treatment. Further, each opposing surface 5 has a slant area 6 in the end portion on the leading side (i). Additionally, the opposing surfaces 5 which are subjected to the above-described roughening treatment, and the smooth areas 5a are formed in crown shapes exhibiting predetermined curvatures.

The end surface (end portion) 2 on the trailing side (ii) of the slider 1 has a thin-film element 3. The thin-film element 3 is a laminate of a magnetic material such as permalloy (Ni—Fe alloy), an insulating material such as aluminum oxide ($Al_2O_3$) and other materials, and includes a magnetic sensing region to reproduce magnetic signals recorded on the disk or a magnetic recording region to record magnetic signals on the disk, or both of such magnetic sensing region and magnetic recording region. The magnetic recording region may be, for example, an MR head composed using a magnetoresistive element (MR element). Meanwhile, the magnetic sensing region may be composed using an inductive head which includes a coil and a core formed by patterning.

In the present invention, the center line mean roughness $R_{ah1}$ of each opposing surface 5 subjected to the roughening treatment is larger than the center line mean roughness $R_{ah2}$ of the smooth area 5a which occupies a predetermined trailing-side area on the opposing surface. The difference in the center line mean roughness is attributed to the fact that the area on the opposing surface 5 other than the smooth area 5a has been subjected to an ion-milling process while the smooth area 5a has not been influenced by the ion-milling process, namely, has not been subjected to the roughening treatment. Since the slider 1 is formed using a ceramic material which is prepared from a composition including several types of grains having different ion-milling rates, when the slider is subjected to the milling process, the grains having lower milling rates are left on the opposing surfaces more readily than the grains having higher milling rates. Accordingly, by the milling process, each of the opposing surfaces 5 possesses a roughened area having a predetermined center line mean roughness $R_{ah1}$ which depends on the combination of the grains.

Further, by ion-milling each opposing surface 5 to form the roughened area, a step portion 5' is formed between the roughened area and the smooth area 5a remaining on the trailing side, namely, the area roughened by the milling process is formed at a level lower than the smooth area 5a by a mean height of h1. Due to the existence of such a step portion 5', the spacing loss in the floating state can be reduced, and satisfactory characteristics of the head can be achieved.

In the present invention, when the center line mean roughness of the disk surface is represented by $R_{ad}$, the sum of $R_{ad}$ and the center line mean roughness $R_{ah1}$ of the area on each opposing surface 6 subjected to the roughening treatment should preferably fall within the range, 6 nm $\leq R_{ah1} + R_{ad} \leq 19$ nm. If the sum of $R_{ah1}$ and $R_{ad}$ is below the range, the real contact area between the opposing surfaces 5 and the surface of the recording medium (disk surface) when the recording medium is at a standstill becomes larger, the static frictional force also becomes large, and as a result, the torque necessary for starting the recording medium becomes too large. On the other hand, if the sum of $R_{ah1}$ and $R_{ad}$ is above the range, the surface of the recording medium (disk surface) will readily be damaged.

More specifically, in the case where the recording medium is of a type coping with high-density recording and has a center line mean roughness $R_{ad}$ of the surface of approximately 3 nm, the roughened area on each opposing surface 5 should preferably have a center line mean roughness $R_{ah1}$ of 3 nm to 16 nm.

The center line mean roughness $R_{ah1}$ of the roughened area on each opposing surface 5 depends on the time period for milling, and the formulation of the ceramic material for the slider 1, though it is particularly largely influenced by the latter. Accordingly, the formulation of the ceramic material and other parameters should be determined such that the center line mean roughness $R_{ah1}$ of the roughened area on each opposing surface 5 should fall within the above-described range.

Further, since the maximum roughness $R_{max}$, which is an index of surface roughness in addition to the center line mean roughness $R_{ah}$, can be assumed to be approximately 10 times the center line mean roughness $R_{ah}$, when the maximum roughness of the roughened area on each opposing surface 5 is represented by $R_{maxh1}$, and that of the disk surface is represented by $R_{maxd}$, the preferable range for the sum of $R_{maxh1}$ and $R_{maxd}$ is 60 nm$\leq R_{maxh1} + R_{maxd} \leq$190 nm.

Meanwhile, the center line mean roughness $R_{ah2}$ of each smooth area 5a remaining in the length T on the trailing side (ii) should preferably be 0.2 nm to 2 nm. Incidentally, the mean height h1 of the step portion 5' should preferably be 3 nm to 50 nm, and the length T of each smooth area 5a should preferably be 5 µm to 400 µm.

In the present invention, aluminum oxide-titanium carbide ($Al_2O_3$—TiC) can be listed as an example of the ceramic material for the slider 1.

Figure 4:
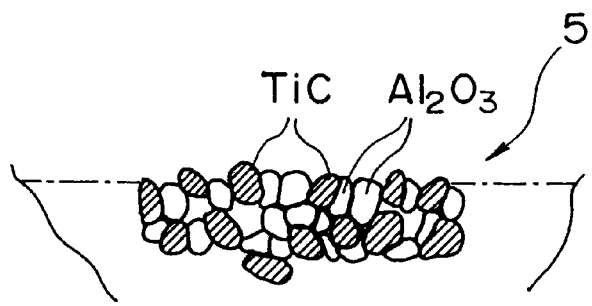
FIG. 4 is an enlarged schematic diagram showing the situation of a roughened surface of a slider which is formed of a ceramic composite material including $Al_2O_3$ and TiC.

Aluminum oxide-titanium carbide is a composition including aluminum oxide grains and titanium carbide grains. Since titanium carbide (TiC) exhibits a milling rate lower than aluminum oxide ($Al_2O_3$) in ion milling, the titanium carbide grains are left on the opposing surfaces 5 while the aluminum oxide grains are shaved to form roughened areas having a predetermined center line mean roughness, as shown in FIG. 4,. The degree of surface roughness of the a roughened areas is largely influenced by the ratio of aluminum oxide and titanium carbide.

In the present invention, the ratio of aluminum oxide and titanium carbide should preferably satisfy the relationship, $Al_2O_3$:TiC=50:50 to 95:5 (% by weight), in order to adjust the real contacting area between the opposing surfaces 5 of the slider 1 and the surface of the recording medium to an optimum value, and reduce the torque for starting the recording medium.

Since aluminum oxide exhibits a milling rate higher than titanium carbide as described above, when the weight ratio of aluminum oxide is made larger while that of titanium carbide is made smaller, the distribution of the titanium carbide grains, which protrude from the opposing surfaces 5 as shown in FIG. 4, will be sparse to reduce the center line mean roughness. In contrast, when the content of titanium carbide is made larger, the titanium carbide grains will remain densely on the opposing surfaces, and the center line mean roughness will be also reduced. Accordingly, the weight ratios of aluminum oxide and titanium carbide should preferably fall within the above-described range in order to adjust the center line mean roughness of each opposing surface 5 to an optimum value.

Next, the method for manufacturing a magnetic head according to the present invention will be illustrated with reference to FIGS. 3A to 3D.

Figure 3A:
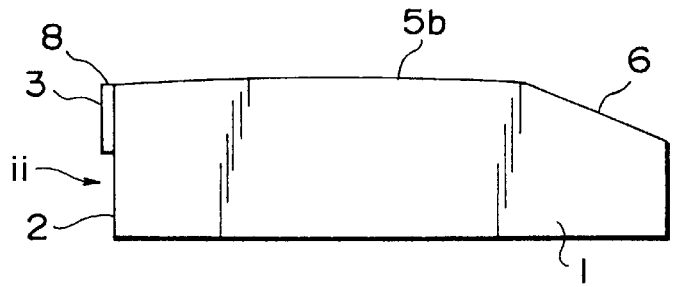
FIGS. 3A to 3D are side views showing step by step the method for manufacturing a magnetic head according to the present invention.

Initially, as shown in FIG. 3A, a slider 1 is formed using a ceramic material containing a composition which includes several types of grains having different milling rates, and a thin-film element 3 is formed on the end surface 2 of the slider 1 using permalloy, aluminum oxide and others, said end surface being situated on the trailing side (ii). Further, the surface 5b of each rail portion 4 is subjected to a polishing (lapping) process to reduce the center line mean roughness $R_{ah}$ of the surface 5b. At this time, the surface 5b of the rail portion 4 has a crown with a predetermined curvature.

Figure 3B:
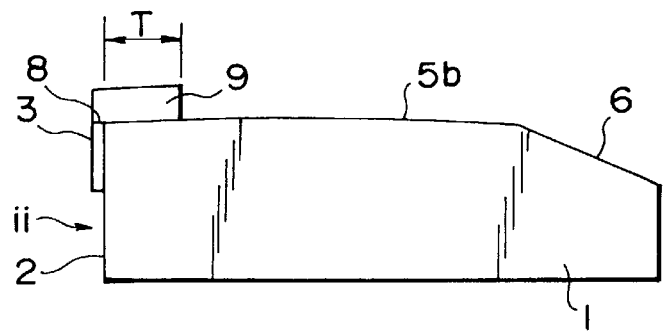

Next, as shown in FIG. 3B, a resist layer 9 is formed so as to cover the upper surface of the exposed portion 8 of the thin-film element 3 on the trailing side, and an area on the surface 5b, the area ranging up to the line of a length T from the trailing-side end. The length T should preferably be approximately 5 µm to 400 µm.

Figure 3C:
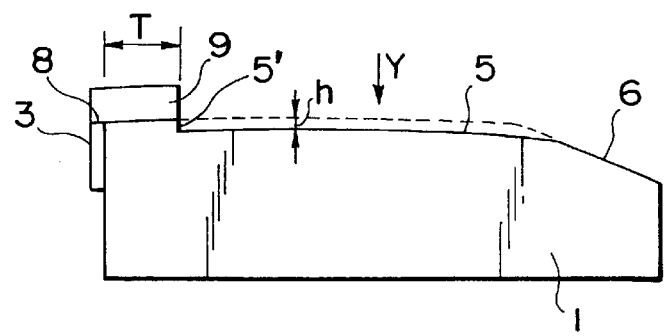

Referring to FIG. 3C, the surface 5b shown in FIG. 3B is shaved by an ion-milling process except for the area having a length T from the trailing-side end. As a result, the area remains as a smooth area 5a, the surface 5b other than the smooth area is processed into a roughened area on an opposing surface 5, and a step portion 5' is created between them.

More specifically, a neutralized Ar (argon) gas may be used for the ion-milling process, and the surface 5b is irradiated with the ions in the direction indicated by the arrow Y in FIG. 3C. As a result, according to a physical action, the surface 5b is shaved to form the step portion 5' and the roughened area on the opposing surface 5, as shown in FIG. 4.

Figure 3D:
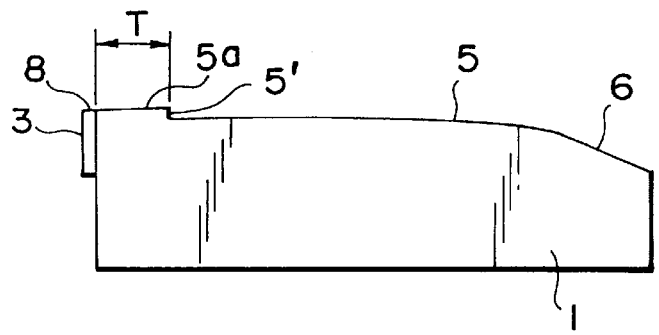

Next, as shown in FIG. 3D, the resist layer 9 is removed, and then the smooth area 5a having a length T is exposed. Since the smooth area 5a, which occupies a predetermined range in the end portion on the trailing side of the opposing surface, has not been influenced by the ion milling process due to the existence of the resist layer 9, the center line mean roughness $R_{ah2}$ of the smooth area 5a is small. The preferable range for the center line mean roughness $R_{ah2}$ of the smooth area 5a is approximately 0.2 to 2 nm.

Similar to the smooth area 5a, the thin-film element 3 is also covered by the resist layer 9 and is not influenced by the ion-milling process, and therefore, no element recess is generated.

In the present invention, the resist layer 9 serves as a protective layer to prevent the generation of an element recess, and to prevent the thin-film element 3 from being influenced by the ion-milling process. Although such a resist layer 9 may be formed so as to cover only the upper surface of the exposed portion 8 of the thin-film element 3, and the entire surface 5b may be subjected to the milling process, it is extremely difficult in view of manufacture to form a resist layer 9 only on the upper surface of the exposed portion 8 of the thin-film element 3. Due to this, as shown in FIG. 3B, the resist layer 9 is formed so as to also cover an area on the surface 5b, the area having a length T from the end on the trailing side.

In the magnetic head H shown in FIG. 1, the slider 1 is supported by a flexure disposed in the tip portion of a load beam, and the slider 1 is urged by a predetermined force onto a hard disk serving as a recording medium.

The magnetic head can be used in a CSS-type hard disk drive (magnetic recording/reproducing apparatus). When the disk is at a standstill, the slider 1, and principally the opposing surfaces 5, comes into contact with the surface of the disk. When the disk is operated to move in the direction indicated by the arrow X in FIG. 1, the entire slider 1 floats apart from the surface of the disk by an air stream introduced into the space between the slider 1 and the surface of the disk. At this time, the slider takes an attitude in which the leading side (i) is lifted above the surface of the disk so as to be higher than the trailing side (ii), or only the leading side floats apart from the surface of the disk while the end portion of the smooth area 5a on the trailing side (ii) slides on the disk with continuously or discontinuously contacting the surface of the disk.

In the magnetic head of the present invention, the center line mean roughness $R_{ah1}$ of the roughened areas of the slider is appropriately adjusted such that the center line mean roughness $R_{ah1}$ of the roughened area on each opposing surface 5 and the center line mean roughness $R_{ad}$ of the surface of the disk satisfy the relationship of 6 nm$\leq R_{ah1}+R_{ad}\leq$19 nm. In this manner, the real contact area between the opposing surfaces of the slider 1 and the surface of the disk is reduced as much as possible. Due to this, even if a lubricant and a water film may be present between the disk and the slider 1, adsorption between the slider 1 and the disk rarely occurs, and the static frictional force relating to starting the disk is not increased. Accordingly, the torque for starting the disk can be reduced.

EXAMPLES

Examples of magnetic heads each including a slider will be illustrated below.

Initially, several magnetic heads which have the same shape as shown in FIG. 1 and have different center line mean roughnesses $R_{ah1}$ of the roughened area on each opposing surface 5 were manufactured in order to examine the relationship between the center line mean roughness $R_{ah1}$ and the starting torque (g·cm). In this experiment, the center line mean roughness $R_{ah1}$ of the roughened area on each opposing surface 5 was varied by changing the time period for milling.

Incidentally, an aluminum oxide-titanium carbide composition in which the TiC content was 35% by weight was used for each slider 1, and each hard disk used as a recording medium had a center line mean roughness $R_{ad}$ of 3 nm.

Figure 5:
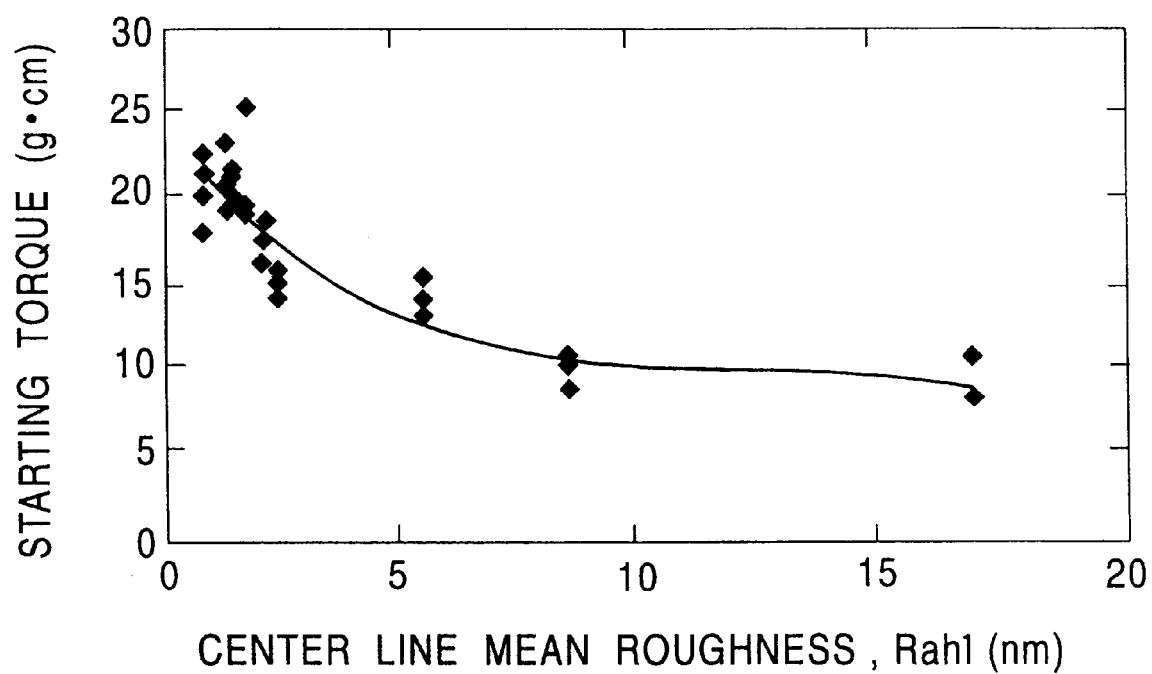
FIG. 5 is a graph showing the relationship between the starting torque and the center line mean roughness $R_{ah1}$ of an opposing surface of a magnetic head which has the shape shown in FIG. 1 and whose slider is formed using aluminum oxide-titanium carbide ($Al_2O_3$:TiC=65% by weight:35% by weight)

FIG. 5 is a graph showing the relationship between the center line mean roughness $R_{ah1}$ of the roughened area on each opposing surface 5 and the starting torque.

As is obvious from FIG. 5, the starting torque (g·cm) decreases in relation to the increase in the center line mean roughness $R_{ah1}$ of the roughened area on each opposing surface 5. From the results of this experiment, it was confirmed that the starting torque (g·cm) can be reduced if the center line mean roughness $R_{ah1}$ is 3 nm or more.

This effect can be explained as follows: When the center line mean roughness $R_{ah1}$ is increased, the real contacting area between the opposing surfaces 5 and the surface of the disk is reduced, and the static frictional force between the slider and the surface of the recording medium (disk) is thereby reduced.

Here, the upper limit of the center line mean roughness $R_{ah1}$ is preferably 16 nm or below. If the center line mean roughness $R_{ah1}$ of the roughened area on each opposing surface 5 is excessively large, protrusions which are tall enough to touch (crash) the disk even when the magnetic head is floating on the disk may be readily generated on the opposing surfaces 5, and as a result, the surface of the disk may be damaged.

In the meantime, the real contacting area between the opposing surfaces 5 and the surface of the disk depends upon the sum of the center line mean roughness $R_{ah1}$ of the roughened area on each opposing surface 5 and the center line mean roughness $R_{ad}$ of the surface of the disk. Actually, in this experiment where the center line mean roughness $R_{ad}$ of the surface of the disk was 3 nm, the preferable range for the center line mean roughness $R_{ah1}$ of the roughened area on each opposing surface 5 was found to be from 3 nm to 16 nm. Accordingly, if the relationship, 6 nm$\leq R_{ah1}+R_{ad}\leq$19 nm, is satisfied, the real contacting area between the opposing surfaces 5 and the surface of the disk can be reduced. As a result, the starting torque can be reduced, and a crash between the slider 1 and the surface of the disk during magnetic recording/reproducing can be prevented.

Figure 8:
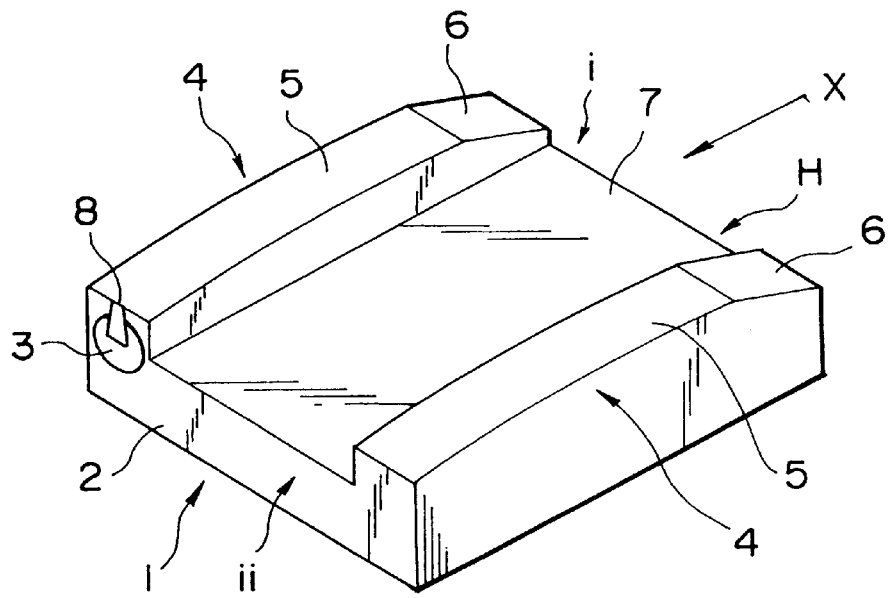
FIG. 8 is a perspective view of a conventional magnetic head when it is placed such that the surface which should oppose the disk faces upward.
Figure 9:
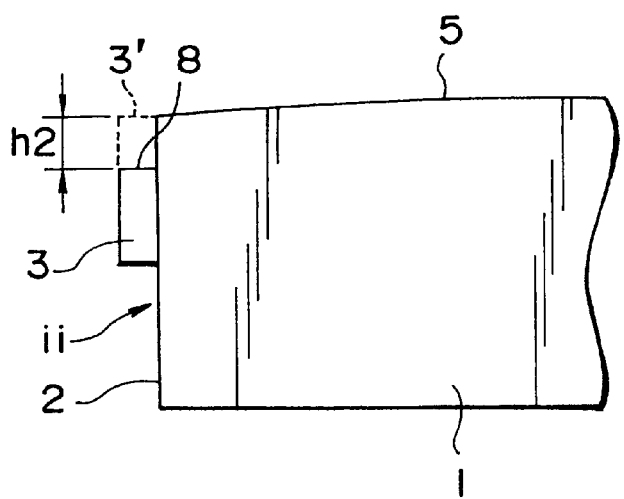
FIG. 9 is a partial side view showing only the trailing side of the magnetic head shown in FIG. 8.

Next, as shown in FIG. 8, magnetic heads in which each opposing surface 5 is the roughened entire top surface of a rail portion 4 and has no step portion 5' and no smooth area 5a (namely, magnetic heads in each of which the thin-film element was directly influenced by ion milling) were manufactured in order to examine the relationship between the center line mean roughness $R_{ah}$ of the opposing surface 5 and the element recess. Incidentally, an aluminum oxide-titanium carbide composition in which the TiC content was 35% by weight was used for each slider 1.

Figure 6:
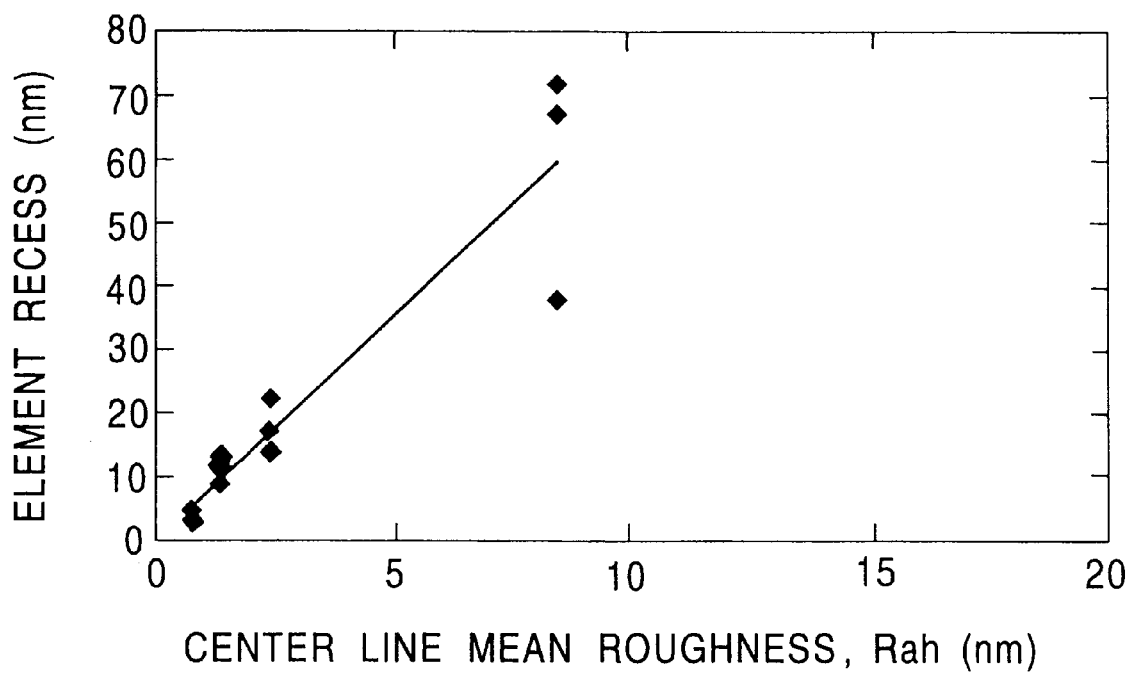
FIG. 6 is a graph showing the relationship between the element recess and the center line mean roughness $R_{ah1}$ of an opposing surface of a magnetic head which has the shape shown in FIG. 8 and whose slider is formed using aluminum oxide-titanium carbide ($Al_2O_3$:TiC=65% by weight:35% by weight)

FIG. 6 is a graph showing the relationship between the center line mean roughness $R_{ah}$ (nm) of the opposing surface 5 and the element recess (nm).

As is obvious from FIG. 6, the element recess (nm) increases in relation to the increase in the center line mean roughness $R_{ah}$ of the opposing surface 5.

This relationship is due to the higher milling rates of aluminum oxide, permalloy and other materials as the constituents of the thin-film element 3. From the results of this experiment, it was found that the thin-film element 3 must be protected from the influence of ion milling by a certain manner in order to increase the center line mean roughness $R_{ah}$ of each opposing surface 5.

Next, several magnetic heads which have the same shape as shown in FIG. 1, each include a slider 1 made of an aluminum oxide-titanium carbide composition, and have different ratios of aluminum oxide and titanium carbide, were manufactured in order to examine the relationship between the content of titanium carbide in the aluminum oxide-titanium carbide composition and the starting torque. Incidentally, the time period for milling was common for each head, and was the time period required to achieve a center line mean roughness $R_{ah1}$ of 8 nm in the experiment concerning FIG. 5 in which the slider 1 of each magnetic head was formed of an aluminum oxide-titanium carbide composition containing 35% by weight of titanium carbide. Incidentally, each hard disk used as a recording medium had a center line mean roughness $R_{ad}$ of 3 nm.

Figure 7:
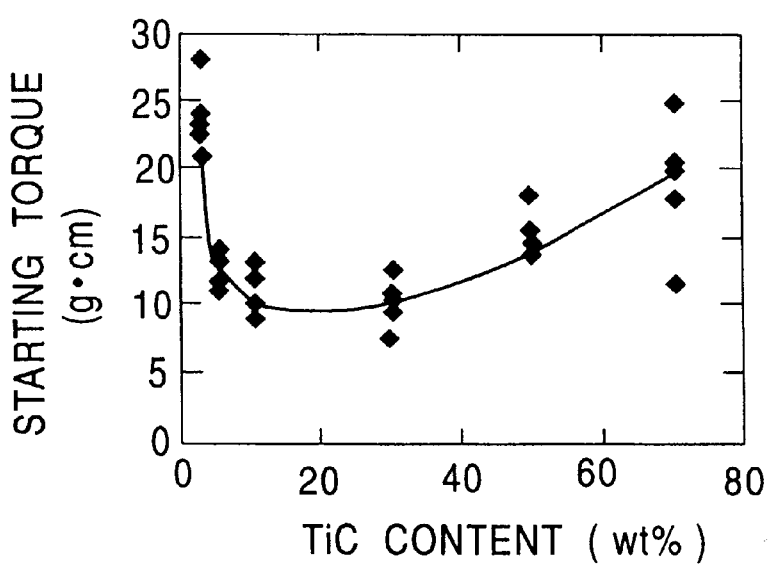
FIG. 7 is a graph showing the relationship between the starting torque and the content of titanium carbide in a magnetic head which has the shape shown in FIG. 1 and whose slider is formed using aluminum oxide-titanium carbide.

As is obvious from the results shown in FIG. 7, the starting torque was a minimum value when the TiC content was approximately 20% by weight, and the starting torque increased in relation to the degree of deviation of the TiC content from approximately 20% by weight.

From the results of this experiments, it was found that the starting torque can be decreased if the TiC content falls within the range from 5 to 50% by weight. This effect can be attributed to the reduction in the real contacting area due to protrusion of the titanium carbide grains, and the low frictional coefficient of the TiC material. Meanwhile, the hardness of TiC (Hv 3200) is higher than that of $Al_2O_3$ (Hv 2000), and the slider is capable of exhibiting sufficient abrasion resistance against sliding on the recording medium due to the high hardness of TiC.

The starting torque increases with a TiC content less than 5% by weight, since almost no titanium carbide grains, which have a milling rate lower than aluminum oxide grains, remain on the opposing surfaces 5 after the milling process, and the opposing surfaces 5 remain smooth, which results in a large real contacting area between the opposing surfaces 5 and the surface of the disk.

On the other hand, the starting torque also increases with a TiC content above 50% by weight, since an excessive number of titanium carbide grains remain on the opposing surfaces 5 after milling, and the opposing surfaces 5 thereby become smooth, which also results in a large real contacting area between the opposing surfaces 5 and the surface of the disk.

As described above, according to the present invention, since a resist layer is formed on the thin-film element for and prior to the process of milling the opposing surfaces of the slider, the thin-film element can be protected from the influence of the milling process, and as a result, generation of an element recess can be prevented.

Further, when the center line mean roughness of the roughened area on each opposing surface of the slider is represented by $R_{ah}$ while that of the surface of the recording medium is represented by $R_{ad}$, since the center line mean roughness $R_{ah}$ is appropriately adjusted such that the relationship, 6 nm $\leq R_{ah}+R_{ad} \leq$ 19 nm, is satisfied, the real contacting area between the opposing surfaces and the surface of the recording medium can be reduced, and adsorption between the opposing surfaces and the surface of the disk due to damp or lubricant can be prevented. As a result, the torque for starting the disk in a CSS-type hard disk drive or the like can be reduced.

Moreover, since the center line mean roughnesses of each of the opposing surfaces and the surface of the disk are appropriately adjusted within the above-described range, the slider and the surface of the disk can be prevented from touching (crashing) each other during magnetic recording/reproducing, and therefore, damage to the surface of the disk can be prevented.

Furthermore, since the slider is formed of a composition including grains having different milling rates, the roughness of each opposing surface can readily be adjusted to an optimum degree by a milling process.

What is claimed is:

1. A magnetic recording/reproducing apparatus including a recording medium and a magnetic head, wherein said magnetic head includes:
    a slider which comes into contact with the surface of said recording medium when said recording medium is at a standstill, and which takes a floating attitude while receiving a floating force from an air stream on the surface of said recording medium according to the movement of said recording medium such that an end portion on the trailing side floats or slides on the recording medium,
    wherein said slider comprises an aluminum oxide-titanium carbide composition containing $Al_2O_3$ and TiC grains, and
    wherein the $Al_2O_3$:TiC ratio is 50:50 to 95:5 in terms of % by weight;
    an element for magnetic recording and/or reproducing provided in said trailing-side end portion of the slider,
    wherein said slider includes opposing surfaces which oppose the recording medium, and each said opposing surface is roughened except for a predetermined non-roughened area in the end portion on the trailing side,
    wherein the center line mean roughness $R_{ah2}$ of said non-roughened area on the trailing side of each said opposing surface is 0.2 to 2 nm; and
    when the center line mean roughness of the roughened area on each said opposing surface is represented by $R_{ah1}$ while the center line mean roughness of the surface of the recording medium is represented by $R_{ad}$, the relationship, 6 nm $R_{ah1}+R_{ad}$ 19 nm, is satisfied.

2. A magnetic recording/reproducing apparatus including a recording medium and a magnetic head, wherein said magnetic head includes:
    a slider which comes into contact with the surface of said recording medium when said recording medium is at a standstill, and which takes a floating attitude while receiving a floating force from an air stream on the surface of said recording medium according to the movement of said recording medium such that an end portion on the trailing side floats or slides on the recording medium;
    an element for magnetic recording and/or reproducing provided in said trailing-side end portion of the slider, and wherein
    said slider includes opposing surfaces which oppose the recording medium, and each said opposing surface is roughened except for a predetermined non-roughened area in the end portion on the trailing side,
    wherein a step portion having a mean height h1 of 3 to 50 nm is present on each said opposing surface at the boundary between said roughened area and said non-roughened area, and
    wherein the center line mean roughness $R_{ah2}$ of said non-roughened area on the trailing side of each said opposing surface is 0.2 to 2 nm;
        when the center line mean roughness of the roughened area on each said opposing surface is represented by $R_{ah1}$ while the center line mean roughness of the surface of the recording medium is represented by $R_{ad}$, the relationship, 6 nm $R_{ah1}+R_{ad}$ 19 nm, is satisfied.

3. A magnetic recording/reproducing apparatus including a recording medium and a magnetic head, wherein said magnetic head includes:
    a slider which comes into contact with the surface of said recording medium when said recording medium is at a standstill, and which takes a floating attitude while receiving a floating force from an air stream on the surface of said recording medium according to the movement of said recording medium such that an end portion on the trailing side floats or slides on the recording medium,
    wherein said slider comprises an aluminum oxide-titanium carbide composition containing $Al_2O_3$ and TiC grains, and
    wherein the $Al_2O_3$:TiC ratio is 50:50 to 95:5 in terms of % by weight;
    an element for magnetic recording and/or reproducing provided in said trailing-side end portion of the slider, and wherein
    said slider includes opposing surfaces which oppose the recording medium, and each said opposing surface is roughened except for a predetermined non-roughened area in the end portion on the trailing side,
    wherein the length T of said non-roughened area of each said opposing surface is 5 to 400 $\mu$m; and
    when the center line mean roughness of the roughened area on each said opposing surface is represented by $R_{ah1}$ while the center line mean roughness of the surface of the recording medium is represented by $R_{ad}$, the relationship, 6 nm $R_{ah1}+R_{ad}$ 19 nm, is satisfied.

4. A magnetic recording/reproducing apparatus including a recording medium and a magnetic head, wherein said magnetic head includes:

a slider which comes into contact with the surface of said recording medium when said recording medium is at a standstill, and which takes a floating attitude while receiving a floating force from an air stream on the surface of said recording medium according to the movement of said recording medium such that an end portion on the trailing side floats or slides on the recording medium, wherein said slider comprises an aluminum oxide-titanium carbide composition containing $Al_2O_3$ and TiC grains, and wherein the $Al_2O_3$:TiC ratio is 50:50 to 95:5 in terms of % by weight;

an element for magnetic recording and/or reproducing provided in said trailing-side end portion of the slider, and wherein said slider includes opposing surfaces which oppose the recording medium, and each said opposing surface is roughened except for a predetermined non-roughened area in the end portion on the trailing side, wherein a step portion having a mean height h1 of 3 to 50 nm is present on each said opposing surface at the boundary between said roughened area and said non-roughened area; and when the center line mean roughness of the roughened area on each said opposing surface is represented by $R_{ah1}$ while the center line mean roughness of the surface of the recording medium is represented by $R_{ad}$, the relationship, 6 nm $R_{ah1}+R_{ad}$ 19 nm, is satisfied.

5. A magnetic recording/reproducing apparatus including a recording medium and a magnetic head, wherein said magnetic head includes:

a slider which comes into contact with the surface of said recording medium when said recording medium is at a standstill, and which takes a floating attitude while receiving a floating force from an air stream on the surface of said recording medium according to the movement of said recording medium such that an end portion on the trailing side floats or slides on the recording medium;

an element for magnetic recording and/or reproducing provided in said trailing-side end portion of the slider, and wherein said slider includes opposing surfaces which oppose the recording medium, and each said opposing surface is roughened except for a predetermined non-roughened area in the end portion on the trailing side, wherein the length T of said non-roughened area of each said opposing surface is 5 to 400 nm; and when the center line mean roughness of the roughened area on each said opposing surface is represented by $R_{ah1}$ while the center line mean roughness of the surface of the recording medium is represented by $R_{ad}$, the relationship, 6 nm $R_{ah1}+R_{ad}$ 19 nm, is satisfied, wherein the center line mean roughness $R_{ah2}$ of said non-roughened area on the trailing side of each said opposing surface is 0.2 to 2 nm.

* * * * *